United States Patent [19]

Jensen

[11] 4,328,462

[45] May 4, 1982

[54] EROSION PROBE HAVING INDUCTANCE SENSOR FOR MONITORING EROSION OF A TURBOMACHINE COMPONENT

[75] Inventor: Richard C. Jensen, Greensburg, Pa.

[73] Assignee: Carrier Corporation, Syracuse, N.Y.

[21] Appl. No.: 262,853

[22] Filed: May 12, 1981

Related U.S. Application Data

[63] Continuation-in-part of Ser. No. 958,294, Nov. 6, 1978, abandoned.

[51] Int. Cl.³ .............. G01R 33/12; G01B 7/10; G01N 17/00
[52] U.S. Cl. .......................... 324/229; 73/86; 324/71 E
[58] Field of Search .......... 324/207, 208, 219, 226, 324/228, 229, 71 E; 73/86; 310/68 B; 340/679, 682

[56] References Cited

U.S. PATENT DOCUMENTS

| | | | |
|---|---|---|---|
| 3,015,950 | 1/1962 | Doctor et al. | 324/71 E |
| 3,340,727 | 9/1967 | Bracalente et al. | 324/71 E |
| 4,107,603 | 8/1978 | Slough | 324/207 |
| 4,143,319 | 3/1979 | Rouam | 324/219 |

*Primary Examiner*—Gerard R. Strecker
*Attorney, Agent, or Firm*—J. Raymond Curtin; John S. Sensny

[57] ABSTRACT

An erosion probe for monitoring erosion of a component of a turbomachine by fluid flow therepast comprising a shell having a predetermined erosion rate proportional to the erosion rate of the component, and an electric inductance sensor encapsulated secured within the shell for generating an electric signal indicative of shell erosion.

9 Claims, 6 Drawing Figures

EROSION PROBE HAVING INDUCTANCE SENSOR FOR MONITORING EROSION OF A TURBOMACHINE COMPONENT

BACKGROUND OF THE INVENTION

This application is a continuation-in-part of my co-pending application Ser. No. 958,294, filed Nov. 6, 1978, now abandoned.

This invention generally relates to erosion probes and more specifically to erosion probes employing an electric inductance sensor for monitoring erosion of a turbomachine component.

As is well understood in the art, the various components of a turbomachine may gradually erode during operation, particularly if a fluid having a significant amount of particulates or contaminants is employed in the machine. Consequently, it is often desirable to monitor the erosion of these turbomachine components so that they are replaced or repaired as needed. Recently, electric inductance sensors have been developed which can be employed to measure the average thickness of a material. These sensors are vey sensitive, relatively inexpensive, and operate comparatively independent of temperature, and attention has been directed toward using these inductance sensors to monitor erosion of turbomachine components.

Employing these electric inductance sensors in a turbomachine is complicated by a number of factors. First, these inductance sensors and any wiring or signal conduit associated therewith must be protected from the fluid flow through the turbomachine to prevent the fluid flow from damaging the sensor and associated wiring. Second, because these sensors operate on the principle of inducing a current in an object and then sensing changes in this induced current, the sensors must be located in close proximity to this object. Third, many of the critical components of a turbomachine, and particularly the portions of these components most directly exposed to the fluid flow, are substantially surrounded by the fluid flow through the turbomachine, rendering it difficult if not practically impossible to locate an electric inductance sensor in close proximity to such a critical component and, simultaneously, to protect the sensor and its associated wiring from the fluid flow.

Fourth, the orientation of the sensor, both relative to the object whose erosion is being sensed and to the direction of the fluid flow through the turbomachine, is important for effective operation of the sensor. More specifically, preferably the object whose erosion is being directly sensed defines a substantially planar surface facing and perpendicular to the fluid flow through the turbomachine. This arrangement has the advantage of producing a comparatively large erosion and erosion rate in terms of absolute values, which assists detecting and monitoring relatively small changes in the erosion of the sensed object. In addition, preferably the front surface of the sensor, referred to as the transducer surface, is parallel to the above-mentioned planar surface facing the fluid flow because, due to the manner in which these sensors are constructed, such an arrangement maximizes the current induced in the sensed object. Thus, the transducer surface is preferably parallel to the front surface defined by the object whose erosion is being sensed and, as a result of this, perpendicular to the direction of the fluid flow past this object.

The task is further complicated by the fact that, in many cases, the considerations discussed above cannot be satisfactorily met by imbedding or inserting an electric inductance sensor within a turbomachine component itself, particularly if the component is relatively small. There are a number of reasons for this further complication. For example, many turbomachine elements are not large enough to receive the sensor and the associated equipment in a preferred orientation and position while still protecting the sensor and any associated wiring from the fluid flow. Also, even if a turbomachine component is sufficiently massive to contain and protect the sensor, then boring, tooling, or otherwise machining a recess or cavity in the component so that the sensor may be properly fitted therein may significantly weaken the component, reducing its reliability and effective life span.

SUMMARY OF THE INVENTION

In view of the above, an object of the present invention is to improve probes for monitoring the erosion of turbomachine components.

Another object of this invention is to employ an electric inductance sensor to monitor the erosion of a turbomachine component.

A further object of the present invention is to provide a probe having an electric inductance sensor which is particularly well suited for monitoring the erosion of relatively small turbomachine components.

Still another object of this invention is to use a relatively simple arrangement for securing an electric inductance sensor in a predetermined orientation within a turbomachine.

These and other objectives are attained with an erosion probe for monitoring erosion of a component of a turbomachine by a fluid flow therepast comprising a shell having a predetermined erosion rate proportional to the erosion rate of the component, and an electric inductance sensor secured within the shell for generating an electric signal indicative of shell erosion. The probe further comprises means for securing the shell to the turbomachine, means encapsulating the sensor within the shell for isolating the sensor from the fluid flow, and transmitting means for transmitting the electric signal from the sensor to a remote location.

A BRIEF DESCRIPTION OF THE DRAWINGS

A DETAILED DESCRIPTION OF THE PREFERRED EMBODIMENT

Generally, the present invention relates to a probe for monitoring erosion of a turbomachine component by a fluid flow therepast. While in the preferred embodiment discussed in detail below, the probe is employed to monitor erosion of the rotor blades of a turbomachine, it will be apparent to those skilled in the art that the erosion probe may also be employed to monitor erosion of other turbomachine components such as stator blades, nozzles, and valves.

Figure 1:
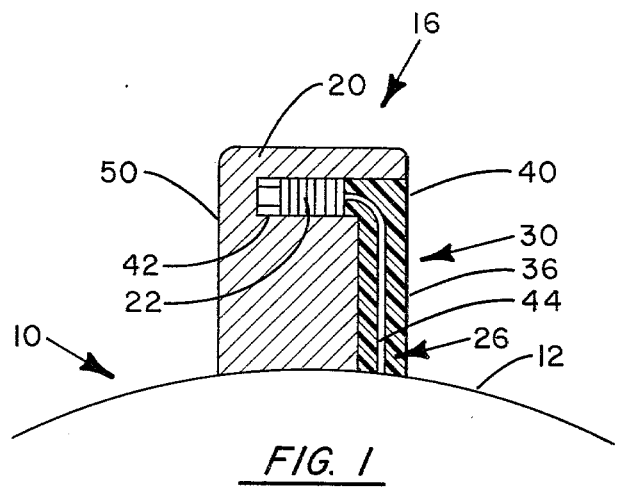
FIG. 1 illustrates portions of a turbomachine and a side view, partially in cross section, of an erosion probe constructed in accordance with one embodiment of the present invention.
Figure 2:
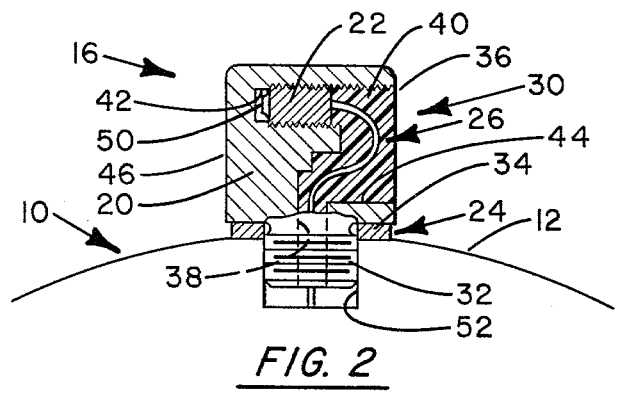
FIG. 2 illustrates portions of a turbomachine and a side view, partially in cross section, of an erosion probe constructed in accordance with a preferred embodiment of the present invention, with the cross sectional portions of the view taken along line II—II of FIG. 3.
Figure 3:
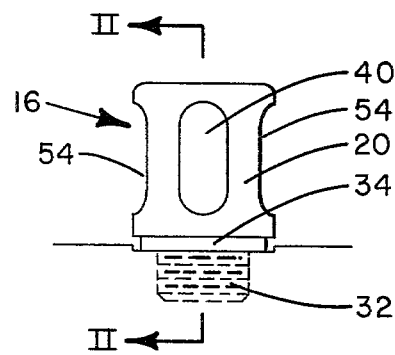
FIG. 3 illustrates a rear view of the erosion probe shown in FIG. 2.
Figure 4:
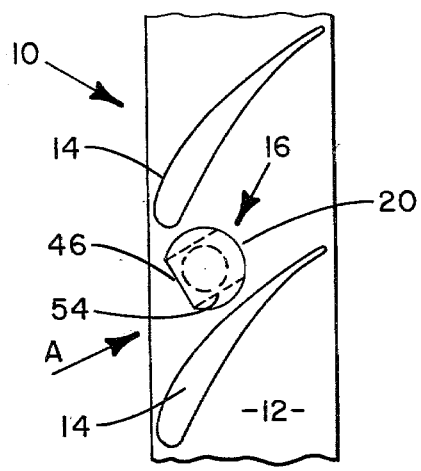
FIG. 4 is a plan view of the erosion probe and of portions of the turbomachine shown in FIGS. 2 and 3.

FIGS. 1 through 4 illustrate portions of turbomachine 10, specifically portions of rotor disc 12 and rotor blades 14, and two embodiments of erosion probe 16 of the present invention, with FIG. 1 showing very broad aspects of the present invention and FIGS. 2, 3 and 4 showing more specific details of the preferred embodiment of the present invention and the preferred use thereof. Generally, erosion probe 16 comprises shell 20, electric inductance sensor 22, securing means 24 (shown only in FIGS. 2 and 3), transmitting means 26, and encapsulating means 30. In turn, preferably securing means 24 includes threaded stem 32 and shim 34, transmitting means 26 includes signal conduit 36, and encapsulating means 30 includes potting material 40.

More particularly, shell 20 is formed of material having a predetermined erosion rate proportional to the erosion rate of rotor blades 14, and preferably the shell is formed of the same material as the rotor blades. Also, preferably shell 20 defines inner socket 42 and rear access cavity 44, which provides access to the inner socket from the rear of the shell. In assembly, with reference to FIG. 4, shell 20 is located in proximity to rotor blades 14 in the fluid flow therepast; and preferably shell 20 defines planar front surface 46 substantially perpendicular to the direction, indicated by the arrow A, of the fluid flow past the shell, rotor disc 12, and the rotor blades.

Electric inductance sensor 22 is secured within shell 20 and, in a manner more fully explained below, generates an electric signal indicative of shell erosion. With the preferred embodiment of shell 20 illustrated in the drawings, sensor 22 is located within inner socket 42, with front, transducer surface 50 of the sensor parallel to front surface 46 of the shell. Sensor 22 may be secured within socket 42 in any suitable manner, for example via mating threads projecting from the sensor and the surfaces of shell 20 defining the inner socket.

Referring now to FIGS. 2 and 3, securing means 24 is provided for securing shell 20 to turbomachine 10, specifically rotor disc 12 thereof. Preferably, shell 20 is releasably secured to rotor disc 12 via threaded stem 32 which projects downward from shell 20 into a cooperating threaded socket 52 defined by the rotor disc. It should be noted that stem 32 may be integral with shell 20 and side surfaces of the shell may define wrench flats 54 to facilitate rotating stem 32 into and out of engagement with socket 52.

As previously indicated, preferably transducer surface 50 of sensor 22, which is fixed within shell 20, and front, planar shell surface 46 are, when assembled within machine 10, both perpendicular to the direction of the fluid flow past the shell. Since, as described above, shell 20 is secured within machine 10 by rotating the shell to thread stem 32 into socket 52, it is clear that the planes of surfaces 46 and 50 rotate as the shell is secured to machine 10. Shim 34 is employed to facilitate tightly securing shell 20 to rotor disc 12 in the above-mentioned orientation, wherein surfaces 46 and 50 are both perpendicular to the direction of the fluid flow past the shell. More particularly, shim 34 is located between the top surface of rotor disc 12 and the bottom surface of shell 20, and the thickness of the shim is chosen so that, as the shell is rotated to secure the shell to the rotor disc, the shell becomes tightly compressed against the shim, and hence becomes tightly secured within turbomachine 10, as the planes of surfaces 46 and 50 become perpendicular to the direction of the fluid flow past shell 20.

As will be understood, in operation sensor 22 is one element of an electric circuit employed to analyze the signal generated by the sensor. Many of the elements of this circuit, discussed in detail below, are distant from probe 16 and sensor 22; and transmitting means 26 is provided for transmitting the electric signal from sensor 22 to a remote location, where the signal may be conventionally conducted to other elements of the circuit mentioned above. Various transmitting means well known in the art may be employed in the practice of the present invention to transmit signals from sensor 22 to a remote location.

For example, transmitting means 26 may comprise a radio telemetry device. Alternately, and preferably, transmitting means 26 includes signal conduit 36 for conducting electric signals between sensor 22 and a slip ring (not shown), which encircles the rotor shaft of turbomachine 10 and which, in a conventional manner, conducts electric signals to and from other elements of the electric circuit used to analyze the signal generated by the sensor. Referring to signal conduit 36 in greater detail, this conduit extends from sensor 22, through rear access cavity 44, and through probe stem 32; and, in assembly, the signal conduit extends through the interior of rotor disc 12 and to the slip ring encircling the turbomachine rotor.

Encapsulating means 30 encapsulates sensor 22 within shell 20 for isolating the sensor from the fluid flow past the shell. That is, encapsulating means 30 covers all sides of sensor 22, protecting the sensor from damage by the fluid flow through turbomachine 10. Preferably, encapsulating means 30 includes potting material 40 substantially filling rear access cavity 44 to prevent fluid from entering the rear access cavity and inner socket 42. Potting material 40 also preferably anchors signal conduit 36 within rear access cavity 44, substantially preventing swinging and snapping movement of the signal conduit within cavity 44 which might be caused by, for example, acceleration and deceleration of rotor disc 12.

Discussing potting material 40 in greater detail, preferably the potting material is an epoxy compound which, when pliable, is fitted into rear access cavity 44, around signal conduit 36. The epoxy is then allowed to harden and adhere to the surfaces of shell 20 defining cavity 44. As will be understood, of course material 40 must be able to withstand the temperatures within turbomachine 10, which may reach 300° C. to 350° C. Various epoxies well known in the art will perform satisfactorily at these temperatures.

Figure 5:
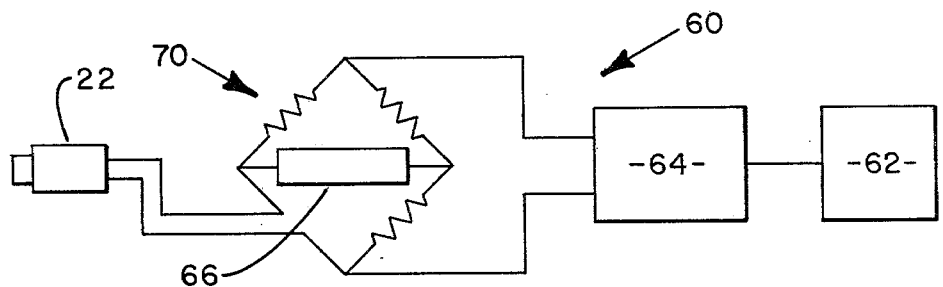
FIG. 5 is a schematic drawing of an electric circuit which may be employed with the present invention.

As previously mentioned, in operation sensor 22 is one element of an electric circuit employed to analyze the signal generated by the sensor to indicate the extent of the erosion of shell 20 and rotor blades 14. FIG. 5 is a schematic representation of this circuit, broadly referenced as 60. Generally, circuit 60 includes digital read out meter 62, demodulator 64, oscillator 66, and bridge network 70, with sensor 22 forming one leg of this bridge network. As is conventional, oscillator 66 supplies an alternating voltage electric current to bridge network 70; and demodulator 64 transmits the output of the bridge network to meter 62, which produces an observable signal representing the output of bridge 70. As mentioned above, sensor 22 is remote from other elements of circuit 60, particularly meter 62. For example, while probe 16 and sensor 22 are located inside turbomachine 10, preferably meter 62 is positioned outside the turbomachine, where the meter may be easily observed by an operator.

In the operation of probe 16, with particular reference to FIGS. 2 and 5, oscillator 66 supplies an alternating voltage electric current to bridge network 70, including inductance sensor 22. This current through sensor 22 generates a varying electromagnetic field therearound, and this electromagnetic field induces an alternating current in shell 20. This induced current, in turn, produces a secondary magnetic field which opposes and reduces the intensity of the original field and of the current conducted through sensor 22. The magnitude of the current induced in shell 20 and, hence, the extent to which the secondary magnetic field decreases the magnitude of the current through sensor 22 depend on, inter alia, the mass or thickness of the front portion of shell 20—that is, the portion of the shell forward of transducer surface 50.

Consequently, as the front portion of shell 20 gradually erodes, the magnitude of the current through sensor 22 changes, and this changes the output of bridge network 70. This latter change is directly sensed by demodulator 64, which produces an analog signal directly proportional to the change in thickness of the portion of shell 20 forward of sensor 22. This signal is visually displayed on meter 62. As will be clear, the display on meter 62 must be calibrated in order to provide an indication of the precise erosion of shell 20 and blade 14. This calibration may be done by means of conventional testing procedures.

Figure 6:
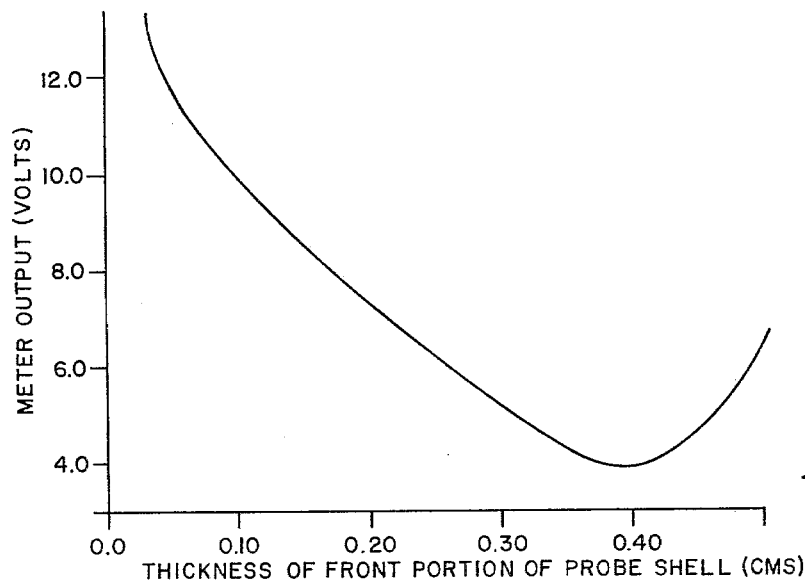
FIG. 6 is a diagram showing one example of the relationship between the output of a meter shown in FIG. 5 and erosion of the probe shown in FIGS. 2, 3 and 4.

FIG. 6 is a graph showing one example of the relationship between the output of meter 62 and the thickness of the front portion of shell 20. Initially, when the thickness of this portion of shell 20 is approximately 0.40 centimeters, the output of meter 62 has a magnitude of approximately 4.0 volts. As shell 20 erodes, for example through the planes represented by the broken lines in FIG. 1, the magnitude of the current through sensor 22 and, thus, the output of meter 62 gradually increase. When the output of meter 62 reaches approximately 11.0 volts, the forward portion of shell 20 is essentially destroyed, indicating that rotor blades 14 and, of course, probe 16 should be replaced. Preferably, when the output of meter 62 reaches a preset value, for example 11.0 volts, and alarm is automatically activated to insure that an operator is alerted to this fact.

Thus, as may be appreciated from a brief review of the above discussion, probe 16 very effectively employs electric inductance sensor 22—with its concomitant advantages—to monitor erosion of turbine blades 14. Sensor 22 may easily be located in very close proximity to the object, the front poriton of shell 20, whose erosion is directly sensed, while at the same time the sensor and signal conduit 36 are protected from the fluid flow past this object. Furthermore, sensor 22 and shell 20 may be positioned in the preferred orientation within turbomachine 10 and may be removed therefrom relatively quickly and simply. In addition, all of the above advantages are accomplished regardless of the size of the turbomachine component being monitored and without requiring any structural modification of that component.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. An erosion probe for monitoring erosion of a component of a turbomachine by a fluid flow therepast comprising:
   a shell having a predetermined erosion rate proportional to the erosion rate of the component;
   means attached to said shell for releasably securing the shell to the turbomachine in the fluid flow path in proximity to said component;
   an electric inductance sensor secured within the shell for generating an electric signal indicative of shell erosion;
   means encapsulating the sensor within the shell for isolating the sensor from the fluid flow; and
   means connected to said sensor for transmitting the electric signal from the sensor to a remote location.

2. An erosion probe as defined by claim 1 wherein:
   the shell defines an inner socket and a rear access cavity for providing access to the inner socket from the rear of the shell;
   the electric inductance sensor is located within the inner socket;
   the transmitting means includes a signal conduit connected to the sensor and extending therefrom through the rear access cavity; and
   the encapsulating means includes means substantially filling the rear access cavity to prevent fluid from entering the inner socket and to anchor the signal conduit within the rear access cavity.

3. An erosion probe as defined by claim 1 wherein:
   the shell defines a front, planar shell surface;
   the sensor defines a front, transducer surface generally parallel to the front shell surface.

4. An erosion probe as defined by claim 1 wherein the means for securing the shell to the turbomachine includes a threaded stem projecting from the shell.

5. An erosion probe as defined by claim 4 wherein the means for securing the shell to the turbomachine further includes a shim to facilitate tightly securing the shell to the turbomachine in a predetermined orientation.

6. An erosion probe as defined by claim 5 wherein the shell defines a wrench flat to assist rotating the shell relative to the turbomachine.

7. an erosion probe for monitoring erosion of a component of a turbomachine by a fluid flow therepast comprising:
   a shell located in the fluid flow path in proximity to the component being monitored, having a predetermined erosion rate proportional to the erosion rate of the component, and defining an inner socket and a rear access cavity for providing access to the inner socket from the rear of the shell;
   an electric inductance sensor secured within the inner socket defined by the shell for generating an electric signal indicative of shell erosion;

a signal conduit connected to the sensor and extending therefrom through the rear access cavity for transmitting the electric signal generated by the shell to a remote location;

means encapsulating the sensor within the shell and maintaining the sensor apart from the fluid flow, including means substantially filling the rear access cavity to prevent fluid from entering the inner socket and to anchor the signal conduit within the rear access cavity;

means releasably securing the shell to the turbomachine, including a threaded stem projecting from the shell and a shim disposed between the shell and a turbomachine surface to facilitate tightly securing the shell to the turbomachine in a predetermined orientation.

8. An erosion probe as defined by claim 7 wherein:
the shell defines a front, planar shell surface generally perpendicular to the fluid flow therepast; and
the sensor defines a front, transducer surface generally parallel to the front shell surface.

9. An erosion probe as defined by claim 8 wherein the shell is releasably secured to a rotor disc of the turbomachine.

* * * * *